United States Patent [19]

Leflar et al.

[11] 4,440,152

[45] Apr. 3, 1984

[54] ZERO GAUGE SOLAR SYSTEM

[75] Inventors: James A. Leflar; Phillip C. Stanwood, both of Fort Collins, Colo.

[73] Assignee: Western Solar Products, Inc., Fort Collins, Colo.

[21] Appl. No.: 314,953

[22] Filed: Oct. 26, 1981

[51] Int. Cl.³ .................................................. F24J 3/02
[52] U.S. Cl. ..................................... 126/435; 126/437; 126/432; 126/900
[58] Field of Search ............... 126/435, 437, 900, 432; 237/19, 65, 66

[56] References Cited

U.S. PATENT DOCUMENTS

| | | | |
|---|---|---|---|
| 1,853,480 | 4/1932 | Wheeler et al. | 126/422 X |
| 4,052,000 | 10/1977 | Honikman | 126/437 X |
| 4,111,259 | 9/1978 | Lebduska | 126/428 X |
| 4,232,657 | 11/1980 | Killorin | 126/435 X |
| 4,239,638 | 12/1980 | Beretta et al. | 126/900 X |
| 4,248,294 | 2/1981 | Budzynski et al. | 126/437 X |
| 4,285,334 | 8/1981 | Collins | 126/437 |

Primary Examiner—Larry Jones
Attorney, Agent, or Firm—Thorpe, North & Western

[57] ABSTRACT

A nonpressurized solar heating system includes a solar collector array through which a heat transfer fluid flows, a conduit for delivering fluid from the solar collector array to a heat exchanger, another conduit for carrying the fluid from the heat exchanger to a fluid expansion tank, and a pump for pumping fluid from the tank to the solar collector array. Fluid from the heat exchanger is received by the tank through an inlet located near the bottom thereof, and fluid is delivered to the pump through an outlet also located near the bottom of the tank. A closable opening is located near the top of the tank for introducing fluid thereinto. The heat transfer fluid is placed in the tank at substantially zero pressure and is then pumped to the other parts of the system. The fluid has a boiling point of about 550° F. at atmospheric pressure, a boiling point exceeding about 400° F. at about 30 feet of liquid vacuum, and a freezing point below about −100° F.

6 Claims, 1 Drawing Figure

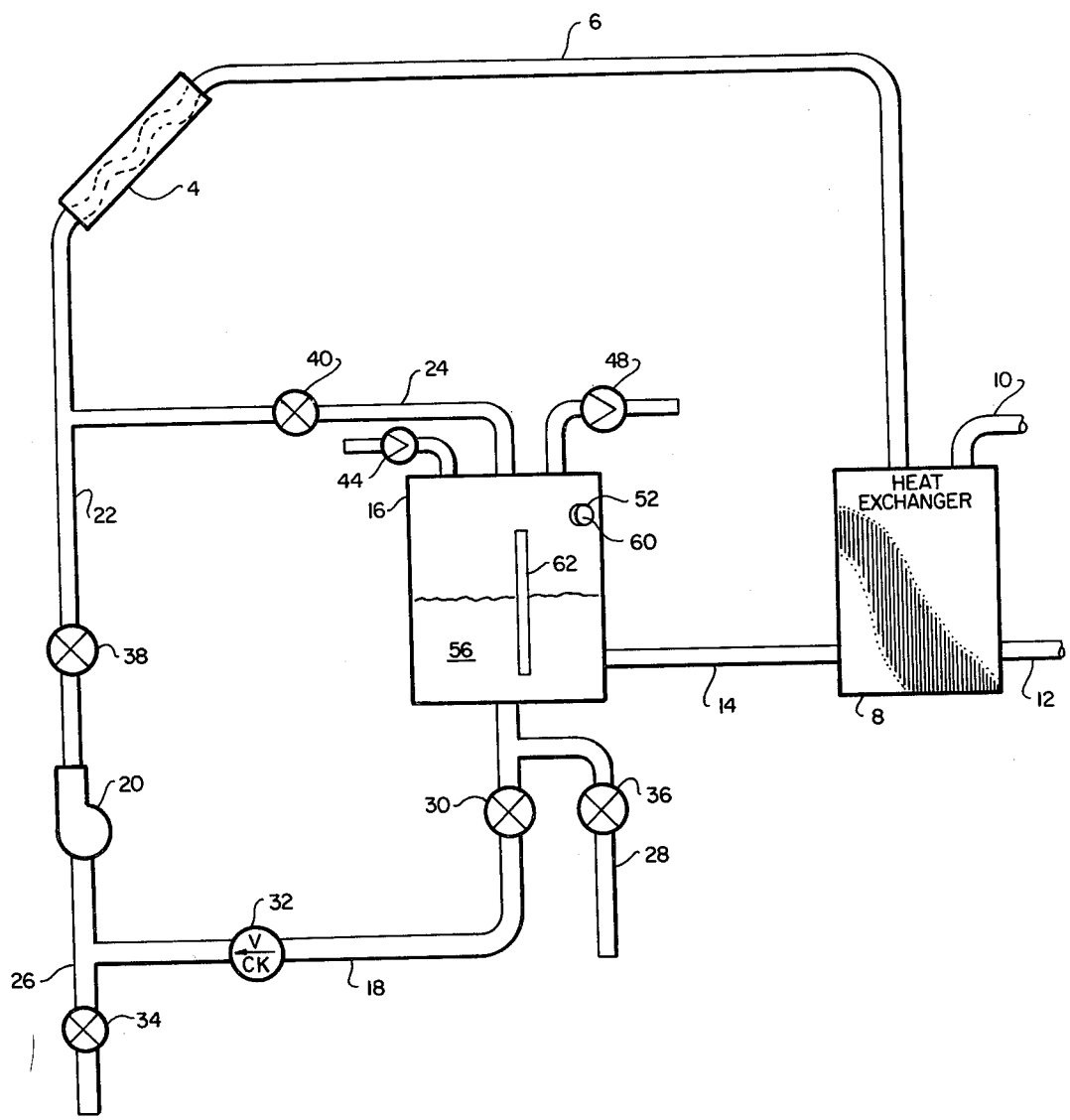

ZERO GAUGE SOLAR SYSTEM

BACKGROUND OF THE INVENTION

This invention relates to a nonpressurized solar heating system which utilizes a heat transfer fluid having a high boiling point and a low freezing point.

Conventional solar heating systems typically include some type of solar collector array through which water or heat transfer fluid is circulated for heating. The solar collector array absorbs the sun's rays to heat the water or fluid flowing therethrough and then supplies the fluid to a heat exchanger where the solar heat is extracted for use or storage. From the heat exchanger the heat transfer fluid flows to an expansion tank and from there it is pumped back to the solar collector array.

If water is employed in the solar heating system, then when the system is not in use, the water must be drained from the system to avoid freezing or boiling and the consequent damage to the solar collector array or system. To avoid freezing without the need for frequent draining, it has been proposed that an "antifreeze" fluid be used in the solar heating systems. However, systems using antifreeze fluids encounter the problem of the fluid boiling when the system is not in operation. This occurs because fluid which is static in a solar collector array exposed to the sun increases dramatically in temperature to the point where it boils. One approach to diminishing the boiling problem is to supply the fluid to and maintain the fluid in the system under pressure. Although this does serve to inhibit boiling to a certain extent, it also introduces other problems, such as the system's gradual but inevitable pressure loss, the need of pressure control equipment in the system, and the need of specialized equipment to fill the system under pressure. Even with pressurized systems, the antifreeze fluid may still tend to boil uner high solar energy conditions and so to avoid this, attempts are usually made to operate such systems constantly at all times of solar energy availability. This is more costly, less reliable, and causes greater wear on the system. It also causes overheating of the solar storage system in many circumstances.

Exemplary prior art systems are disclosed in U.S. Pat. Nos. 4,027,821, 4,109,639, 3,970,069, 4,052,000, 4,121,566 3,986,489, 4,119,087, 4,207,866, 4,133,338, 4,191,329, and 4,019,495.

SUMMARY OF THE INVENTION

It is an object of the invention to provide a solar heating system which need not be pressurized and yet which will avoid the freezing and boiling problems of prior art systems.

It is another object of the invention to provide such a system which is simple in construction and easy to use and maintain.

It is an additional object of the invention to provide such a solar heating system which includes a relatively small fluid expansion tank through which fluid may be introduced into the system under no pressure.

It is also an object of the invention to provide such a system which utilizes a fluid having both a high boiling point when at a low absolute pressure, and low freezing point.

The above and other objects of the invention are realized in a specific illustrative embodiment of a nonpressurized solar heating system which includes a solar collector for heating a heat transfer fluid which flows therethrough, conduits for delivering fluid from the solar collector to a heat exchanger and from the heat exchanger to a fluid expansion tank, and a pump for pumping fluid from the fluid expansion tank back to the solar collector. Fluid is received into the fluid expansion tank through an inlet located near the bottom thereof and also delivered to the pump through an outlet located near the bottom. The fluid expansion tank is filled with fluid to a level above the inlet and outlet so that a closed system operation is achieved. Fluid is introduced into the fluid expansion tank through a closable opening located near the top of the tank. The heat transfer fluid utilized in the system has a boiling point of about 500° F. at atmospheric pressure, a boiling point exceeding about 400° F. at about 30 feet of liquid vacuum, and a freezing point below about $-100°$ F., so that both freezing and boiling of the fluid is avoided.

The above arrangement provides a simple, easy to operate and easy to maintain solar heating system which avoids the difficulties and problems of the prior art pressurized systems.

BRIEF DESCRIPTION OF THE DRAWINGS

The above and other objects, features and advantages of the invention will become apparent from a consideration of the following detailed description presented in connection with the accompanying drawing which shows a nonpressurized solar heating system made in accordance with the principles of the present invention.

DETAILED DESCRIPTION

Referring to the drawing, there is shown a nonpressurized solar heating system which includes a solar collector 4 through which a heat transfer fluid circulates to be heated by the sun. The solar collector 4, which is a conventional collector with a stagnation temperature of about 400° F. or less would be positioned so as to be exposed to the sun for as long a period as possible during the daytime, such as on the roof of a house or other building using the system. The solar collector 4 is coupled by way of a conduit 6 to a heat exchanger which operates in a conventional manner to transfer heat contained in the heat transfer fluid received from the solar collector 4 to another heat transfer fluid flowing through the heat exchanger via conduits 10 and 12. The heat exchanger is coupled by way of another conduit 14 to a fluid expansion tank 16 so as to carry heat transfer fluid from the heat exchanger to the tank. The conduit 14 is coupled into the tank 16 at or near the bottom thereof as shown in the drawing. Also coupled to the tank 16 at or near the bottom is another conduit 18 for carrying heat transfer fluid from the tank 16 to a pump 20. A conduit 22 connects the pump 20 with the solar collector 4.

A conduit 24 is coupled into the conduit 22 and into the top of the tank 16 as shown. A multiple use filling and discharge conduit 26 is coupled into the conduit 18, and a filling and discharge conduit 28 is also coupled into the conduit 18. Disposed in the conduit 18 between the connection of conduits 28 and 26 are a shutoff valve 30 and a check valve 32, the latter of which allows heat transfer fluid to flow from the tank 16 to the pump 20 but not vice versa. Disposed respectively in conduits 26 and 28 are shutoff valves 34 and 36. A shutoff valve 38 is also disposed in the conduit 22 between the pump 20 and the connection of conduit 24. A shutoff valve 40 is disposed in the conduit 24.

Coupled into the top of the tank 16 are a vacuum breaker valve 44 and a pressure relief valve 48. The tank 16 includes an opening 52 through which heat transfer fluid 56 may be introduced, a cap 60 for covering the opening. Also included is a sight gauge window 62 for observing the level of the heat transfer fluid within the tank 16.

The solar heating system of the drawing is prepared for use by filling the system with heat transfer fluid 56 which has both a high boiling point and a low freezing point. Exemplary fluids include petroleum based oils, mineral oils, silicone based oils, synthetic hydrocarbon fluids, etc. For example, BRAYCO #888, which has a boiling point of 550° F. at atmospheric pressure, a boiling point exceeding 400° F. at 30 feet of liquid vacuum, and a freezing point below −100° F., has been found suitable. The heat transfer fluid is introduced into the tank 16 through the opening 52 under no pressure. Simultaneously, the pump 20 is operated to begin pumping fluid through the conduits 18 and 22 to the solar collector 4 and to the other conduits. The pump 20 is positioned at an elevation below that of the tank 16 to insure that the pump 20 is adequately flooded before pumping begins. When the solar heating system is full, and the tank 16 is about ⅓ to ½ full, the filling operation is completed. The correct fluid level is determined by the sight gauge window 62 appropriately fitted in expansion tank 16. The tank 16 serves to allow for expansion or contraction of the heat transfer fluid 56 so that none of the other parts of the system will be damaged if such expansion or contraction occurs.

In operation, fluid is pumped from the tank 16 to the solar collector 4 where it absorbs heat, and from there to the heat exchanger 8 and back to the tank 16. The check valve 32 allows the fluid to flow from the tank 16 to the pump 20 but prevents flow in the reverse direction. This valve is provided to eliminate thermal backflow. Because the inlet to the tank 16 from the conduit 14 and the outlet from the tank to conduit 18 are below the heat transfer liquid level, the system operates as a closed loop system. With a closed loop system, oxidation problems are eliminated and the system can be operated with a smaller pump than is necessary with an open loop or drainback type solar system.

Valves 30 and 38 are provided to allow closing of the respective conduits 18 and 22 so that the pump 20 can be serviced without having the heat exchange fluid drained from the system. When the system is in operation, of course, valves 30 and 38 are in the open condition. Valve 34 in conduit 26 is provided to allow draining of fluid from the system and for automatic filling of the system with heat transfer fluid if, for some reason, that were desired. Valve 36 and conduit 28 are provided as additional connections to allow automatic filling. In such event, the pressure filling equipment would be connected to conduits 26 and 28. Valves 34 and 36 would be opened and valve 30 would be closed. Fluid would be pumped into conduit 26 through valve 34 to conduit 18 where it must pass through and be pumped by pump 20 throughout the solar system, exiting the system through valve 36 and conduit 28 to return to the filling apparatus. In this manner, air is carried out of the solar system and purged through the filling apparatus while heat transfer fluid is completely filling the solar energy system. Of course, such a filling apparatus is only an accessory and is generally not required for filling the described solar energy system.

Conduit 24 and valve 40 are provided so that when the system is to be drained of fluid via conduits 26 or 28 and valves 34 and 36 respectively, air will be allowed into the system via the vacuum break valve 44, into the tank 16 and through the conduit 24 and opened valve 40. After draining is completed, valve 40 would be closed to prevent any communication between the tank 16 and the conduit 22.

The vacuum breaker 44 is provided to open automatically to allow air to flow therethrough into the tank 16 if the pressure exterior to the tank is greater than the pressure in the tank, such as might occur with fluid cooling after system filling. In this manner, the guage pressure in the tank 16 is maintained substantially at or above zero guage pressure. The pressure relief valve 48 is provided as a safety device required in all closed hydronic loops. Valve 48 automatically opens and allows the escape of air if the pressure in the tank 16 exceeds a certain predetermined level. It is desirable that air be allowed to escape rather than fluid and so, by providing the pressure relief valve 48 at the location indicated, air will first escape if the pressure in the system exceeds a certain level. Other parts of the system are thereby protected from harmful effects of pressure building up in the system. Of course, such a protective operation of pressure relief valve 48 is an unlikely event because pressure created by the expanding heat transfer fluid in a closed loop system, with sufficient expansion room, would create only a small fraction of the pressure required to open valve 48. By this virtue, the system also remains closed to the introduction of fresh oxygen into the system via vacuum breaker valve 44.

In the above described manner, a simple, easy to use, and easy to maintain solar heating system is provided. The system need not be pressurized by reason of the structure and heat transfer fluid used, and this avoids the well known problems which attend the use of pressurized systems. Although provision is made for draining fluid from the system, such draining does not have to take place to protect against the liquid freezing. The heat transfer fluid expansion tank 16 need not be large since it does not have a capacity sufficient to hold all of the fluid in the system for drainback. The tank 16 need only be large enough to allow for thermal expansion or contraction of the fluid.

It is to be understood that the above-described arrangements are only illustrative of the application of the principles of the present invention. Numerous modifications and alternative arrangements may be devised by those skilled in the art without departing from the spirit and scope of the invention and the appended claims are intended to cover such modifications and arrangements.

What is claimed is:

1. A nonpressurized solar heating system comprising solar collector means for heating a heat transfer fluid flowing therethrough, means for delivering fluid heated by the solar collector means to a heat exchanger, a fluid expansion tank for receiving fluid through an inlet from a heat exchanger, said inlet being located near the bottom of the tank, and for delivering fluid through an outlet, said outlet being located near the bottom of the tank, said tank including a closable opening through which fluid may be initially introduced into the tank, said opening being located near the top of the tank, pump means located generally below the level of the tank for pumping fluid received thereby, first conduit means for supplying fluid from the outlet of the tank to the pump means, second conduit means for conveying fluid from the pump means to the solar collector means, a heat transfer fluid disposed in the solar collector means, in the delivery means, in the tank above the inlet and outlet, in the pump means, and in the first and second conduit means, said fluid being placed in said tank under substantially no pressure and having a boiling point of about 550° F. at atmospheric pressure, a boiling point exceeding about 400° F. at about 30 feet of liquid vacuum, and a freezing point below −100° F., first valve means disposed in the second conduit means which may be selectively closed to prevent the flow of fluid or open to allow the flow of fluid, outlet conduit means coupled to the first conduit means and through which fluid may flow to drain or fill the system, second valve means disposed in the outlet conduit means which may be selectively opened to allow the flow of fluid or closed to prevent the flow of fluid, third conduit means coupled to the tank at or near the top thereof and to the second conduit means to allow the flow of air therebetween, third valve means disposed in the third conduit means which may be selectively closed to prevent the flow of air in the third conduit means, or opened to allow the flow of air, and fourth valve means disposed in the first conduit means between the connection of the conduit means and the tank, said fourth valve means being selectively closable to prevent the flow of fluid or openable to allow the flow of fluid.

2. A solar heating system as in claim 1 further comprising a vacuum breaker means installed at or near the top of the tank for allowing air to flow into the tank when the pressure outside the tank exceeds the pressure inside the tank.

3. A solar heating system as in claim 1 further comprising a pressure relief valve coupled to the tank at or near the top thereof for releasing air from the tank when the pressure in the tank exceeds a certain level.

4. A solar heating system as in claim 1 further comprising check valve means disposed in the first conduit means for allowing fluid to flow from the tank to the pump means and for preventing fluid from flowing in the reverse direction.

5. A solar system as in claim 1 further comprising
fourth conduit means coupled to the first conduit means between the fourth valve means and the tank for conveying fluid, and
fifth valve means disposed in the fourth conduit means which may be selectively closed to prevent the flow of fluid, or opened to allow the flow of fluid.

6. A solar heating system as in claim 1 wherein said fluid expansion tank includes an elongate window disposed vertically in the side wall thereof to enable viewing the level of the fluid in the tank from outside the tank.

* * * * *